(12) United States Patent
Dawley

(10) Patent No.: US 11,038,192 B2
(45) Date of Patent: Jun. 15, 2021

(54) CONFIGURATIONS FOR POWER MODULE HAVING AN INTEGRATED FLEXIBLE CIRCUIT ASSEMBLY

(71) Applicant: GM GLOBAL TECHNOLOGY OPERATIONS LLC, Detroit, MI (US)

(72) Inventor: Evan J. Dawley, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 123 days.

(21) Appl. No.: 16/429,833

(22) Filed: Jun. 3, 2019

(65) Prior Publication Data

US 2019/0288323 A1    Sep. 19, 2019

Related U.S. Application Data

(63) Continuation-in-part of application No. 15/612,145, filed on Jun. 2, 2017, now Pat. No. 10,375,830.

(51) Int. Cl.
*H01M 10/04* (2006.01)
*H01M 10/0525* (2010.01)
(Continued)

(52) U.S. Cl.
CPC ... *H01M 10/0413* (2013.01); *H01M 10/0525* (2013.01); *H01M 10/613* (2015.04);
(Continued)

(58) Field of Classification Search
CPC ............ H01M 2/206; H01M 10/0431; H01M 10/0525; H01M 10/613; H01M 10/615;
(Continued)

(56) References Cited

U.S. PATENT DOCUMENTS

2003/0224246 A1* 12/2003 Watanabe .......... H01M 2/0247
429/159
2004/0009334 A1    1/2004 Miyamoto et al.
(Continued)

FOREIGN PATENT DOCUMENTS

CN    101877413 A    11/2010
CN    102104182 A    6/2011
(Continued)

*Primary Examiner* — Gregg Cantelmo
(74) *Attorney, Agent, or Firm* — Quinn IP Law

(57) ABSTRACT

Configurations for a power module having a flexible circuit assembly and corresponding method. The flexible circuit assembly has at least one electrically conductive portion. A first plurality of cells is placed adjacent to one another to form a first cell layer, the first cell layer being positioned on a first side of the flexible circuit assembly. Each of the first plurality of cells has a respective cell body with at least four respective edges. The first plurality of cells has respective cell tabs, including a respective first tab and a respective second tab both extending from one of the at least four respective edges. The flexible circuit assembly is configured to be aligned with the first cell layer such that a voltage sensing circuit joint is concurrently completed when the respective cell tabs of the first cell layer are joined to respective captured portions of the flexible circuit assembly.

19 Claims, 5 Drawing Sheets

(51) Int. Cl.
| | |
|---|---|
| *H01M 50/502* | (2021.01) |
| *H01M 50/572* | (2021.01) |
| *H01M 50/547* | (2021.01) |
| *H01M 50/569* | (2021.01) |
| *H01M 50/519* | (2021.01) |
| *H01M 10/613* | (2014.01) |
| *H01M 50/528* | (2021.01) |
| *H01M 10/615* | (2014.01) |
| *H01M 10/625* | (2014.01) |
| *H01M 10/647* | (2014.01) |
| *H01M 50/516* | (2021.01) |
| *H01M 50/512* | (2021.01) |
| *H01M 50/51* | (2021.01) |
| *H01M 10/637* | (2014.01) |

(52) U.S. Cl.
CPC ....... *H01M 10/615* (2015.04); *H01M 10/625* (2015.04); *H01M 10/637* (2015.04); *H01M 10/647* (2015.04); *H01M 50/502* (2021.01); *H01M 50/516* (2021.01); *H01M 50/519* (2021.01); *H01M 50/528* (2021.01); *H01M 50/547* (2021.01); *H01M 50/569* (2021.01); *H01M 50/572* (2021.01); *H01M 50/51* (2021.01); *H01M 50/512* (2021.01)

(58) Field of Classification Search
CPC ............. H01M 10/625; H01M 10/647; H01M 10/657; H01M 10/6571; H01M 10/637; H01M 50/51; H01M 50/512; H01M 50/50; H01M 50/516; H01M 50/519; H01M 50/528; H01M 50/547; H01M 50/569; H01M 50/572

See application file for complete search history.

(56) References Cited

U.S. PATENT DOCUMENTS

| | | | |
|---|---|---|---|
| 2004/0038124 A1* | 2/2004 | Hisamitsu | H01M 10/0413 429/161 |
| 2005/0250005 A1 | 11/2005 | Bacon et al. | |
| 2008/0070102 A1 | 3/2008 | Watanabe et al. | |
| 2009/0023057 A1 | 1/2009 | Kim | |
| 2010/0003594 A1 | 1/2010 | Hong et al. | |
| 2011/0039131 A1 | 2/2011 | Moon | |
| 2011/0151300 A1 | 6/2011 | Herrmann | |
| 2012/0094161 A1 | 4/2012 | Zheng | |
| 2012/0116189 A1 | 5/2012 | Jedema et al. | |
| 2012/0308874 A1 | 12/2012 | Ootani et al. | |
| 2013/0011700 A1 | 1/2013 | Park et al. | |
| 2015/0050523 A1 | 2/2015 | Lee | |
| 2015/0380697 A1 | 12/2015 | Osborne et al. | |

FOREIGN PATENT DOCUMENTS

| | | |
|---|---|---|
| CN | 102867981 A | 1/2013 |
| EP | 2450995 A1 | 5/2012 |
| JP | 2004095357 A | 3/2004 |
| JP | 2009016122 A * | 1/2009 |

* cited by examiner

CONFIGURATIONS FOR POWER MODULE HAVING AN INTEGRATED FLEXIBLE CIRCUIT ASSEMBLY

CROSS-REFERENCE TO RELATED APPLICATIONS

This application is a continuation-in-part of U.S. patent application Ser. No. 15/612,145, filed on Jun. 2, 2017, now U.S. Pat. No. 10,375,830, which is hereby incorporated by reference in its entirety.

INTRODUCTION

The present disclosure relates to various configurations for a power module having an integrated flexible circuit assembly and a corresponding method of assembly. Power modules for generating usable energy have numerous applications in a wide variety of settings. The use of purely-electric vehicles and hybrid vehicles has greatly increased over the last few years. Electric-powered transportation devices may utilize power modules, such as battery modules, to energize a motor/generator. Additionally, power modules may be employed in power conversion equipment such as, but not limited to, industrial motor drives, embedded motor drives and AC-DC power supplies.

SUMMARY

Disclosed herein are various configurations for a power module having a flexible circuit assembly and corresponding method of assembly. The various configurations may be adapted for use in a variety of settings. The flexible circuit assembly has at least one electrically conductive portion, with the flexible circuit assembly defining a first side and a second side. A first plurality of cells is placed adjacent to one another to form a first cell layer, the first cell layer being positioned on the first side of the flexible circuit assembly. Each of the first plurality of cells has a respective cell body with at least four respective edges.

The first plurality of cells has respective cell tabs, including a respective first tab and a respective second tab both extending from one of the at least four respective edges. The flexible circuit assembly is configured to be aligned with the first cell layer such that a voltage sensing circuit joint is concurrently completed when the respective cell tabs of the first cell layer are joined to respective captured portions of the flexible circuit assembly.

The four respective edges may include two long opposing edges and two short opposing edges. In one example, the respective first tab and the respective second tab extend from one of the two long opposing edges. In another example, the respective first tab and the respective second tab extend from one of the two short opposing edges.

The flexible circuit assembly may include a senselead portion having a plurality of traces respectively connected to a plurality of pads. The plurality of traces may be substantially parallel to one another and extend in a first direction. The plurality of pads is substantially parallel to one another and extend in a second direction orthogonal to the first direction. The flexible circuit assembly may include at least one thermal sheet configured to experience a change in electrical resistance in response to a temperature change. The plurality of pads may be configured to extend along a first peripheral portion and a second peripheral portion of the flexible circuit assembly, the first peripheral portion and the second peripheral portion being parallel and on opposing sides.

The power module may include a second plurality of cells having respective cell tabs and placed adjacent to one another to form a second cell layer, the second cell layer being positioned on the second side of the flexible circuit assembly. The respective cell tabs of neighboring pairs of the first cell layer and the second cell layer are configured to be joined to the respective captured portions of the flexible circuit assembly. The flexible circuit assembly may be folded along each of a plurality of axes of rotation such that at least one of the first plurality of cells faces another one of the second plurality of cells.

In another embodiment, the power module may include a third cell layer positioned exterior to the first cell layer $L_1$ and including a third plurality of cells adjacent to one another. A fourth cell layer may be positioned exterior to the second cell layer $L_2$ and includes a fourth plurality of cells adjacent to one another.

In another embodiment, a second plurality of cells is placed adjacent to one another to form a second cell layer, the second cell layer being positioned on the first side of the flexible circuit assembly and adjoining the first cell layer such that the first cell layer and the second cell layer are in a same plane. The flexible circuit assembly may include a plurality of senseline traces and a plurality of pads respectively connected to the plurality of senseline traces. The plurality of pads is electrically conductive on the first side and the second side and configured to interface with the respective first tab and the respective second tab of the first cell layer and the second cell layer.

The flexible circuit assembly may include a first thermal sheet and a second thermal sheet each respectively dimensioned such that at least a portion of the plurality of pads is exposed on the first side and the second side. The first thermal sheet and the second thermal sheet are configured to experience a change in electrical resistance in response to a temperature change.

In yet another embodiment, each of the first plurality of cells has respective cell tabs extending from opposing ends of the at least four edges. The four respective edges may include two long opposing edges and two short opposing edges. In one example, the respective first tab and the respective second tab extend from the two short opposing edges. In another example, the respective first tab and the respective second tab extend from the two long opposing edges.

The respective first tab may be offset from an imaginary center axis in a first direction, the imaginary center axis extending through a center of the respective cell body. The respective second tab may be offset from the imaginary center axis in a second direction opposite to the first direction. The flexible circuit assembly may include at least one thermal sheet and a senselead portion having a plurality of traces respectively connected to a plurality of pads. The thermal sheet is configured to experience a change in electrical resistance in response to a temperature change. The plurality of pads is electrically conductive on the first side and the second side and may be configured to interface along an entire length of the respective cell tabs. Alternately, the plurality of pads may be configured to interface along a respective portion of an entire length of the respective cell tabs, and not the entire length.

In yet another embodiment, the second cell layer may be configured to be staggered relative to the first cell layer such that the respective first tab and the respective second tab of the first cell layer align with the respective first tab and the respective second tab of the second cell layer, enabling tab-to-tab joining between the first cell layer and the second cell layer.

A method of assembling a power module includes welding the respective first tab and the respective second tab to the flexible circuit assembly. The power module may be employed in a laid-out or flat construction. Alternately, the flexible circuit assembly may be folded along one of the at least four respective edges of the first plurality of cells to obtain a folded module.

The above features and advantages and other features and advantages of the present disclosure are readily apparent from the following detailed description of the best modes for carrying out the disclosure when taken in connection with the accompanying drawings.

DETAILED DESCRIPTION

Figures 1, 2:
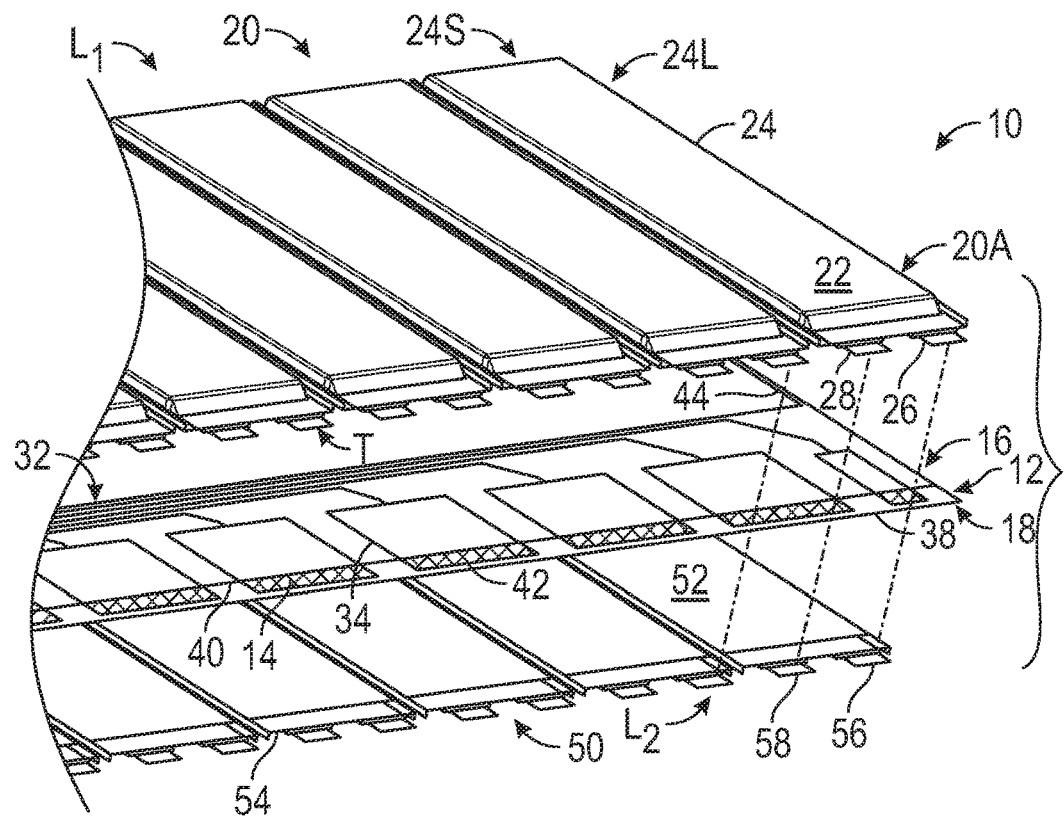
FIG. 1 is a schematic exploded view of a power module in accordance with a first embodiment.
FIG. 2 a schematic fragmentary perspective view of a flexible circuit assembly that may be employed in the power module of FIG. 1.

Referring to the drawings, wherein like reference numbers refer to like components, FIG. 1 is a schematic exploded view of a power module 10 having a flexible circuit assembly 12. It is to be understood that the power module 10 may take many different forms and include multiple and/or alternate components. FIG. 2 is a schematic perspective view of a portion of the flexible circuit assembly 12. The flexible circuit assembly 12 has at least one electrically conductive portion 14 and defines a first side 16 and a second side 18.

Referring to FIG. 1, a first plurality of cells 20, such as cell 20A, is placed adjacent to one another to form a first cell layer $L_1$. The first cell layer $L_1$ is positioned on the first side 16 of the flexible circuit assembly 12. The first plurality of cells 20 may be pouch-type cells, including but not limited to, lithium manganese, lithium ion phosphate, lithium cobalt, lithium-nickel based cells. Referring to FIG. 1, each of the first plurality of cells 20 has a respective cell body 22 with at least four respective edges 24. The first plurality of cells 20 has respective cell tabs T extending from one or more of the respective edges 24.

Referring to FIG. 1, the cell tabs T include a respective first tab 26 and a respective second tab 28. The cell tabs T are configured to be electrically conductive and may be composed of at least one of the following: aluminum, copper, nickel, and their respective alloys. In cell terms, the respective first tab 26 and the respective second tab 28 may be referred to as cathode and anode (or vice-versa). The cathode may be composed of aluminum (positive) and anode may be composed of copper (negative).

In the embodiment shown in FIG. 1, the respective cell body 22 is rectangular and the four respective edges 24 include two long opposing edges 24L and two short opposing edges 24S. However, it is to be appreciated that the shape of the respective cell body 22 may be varied based on the application at hand, including but not limited to, parallelograms, squares and ovals. In the embodiment shown, the first plurality of cells 20 are positioned adjacent to one another along their respective long edges 24L, however, they may be positioned along either end. Additionally, in the embodiment shown in FIG. 1, the respective first tab 26 and the respective second tab 28 extend from one of the two short opposing edges 24S. Alternately, the respective first tab 26 and the respective second tab 28 may extend from one of the two long opposing edges 24L. The first plurality of cells 20 may be lined edge-to-edge or tab-to-tab.

Referring to FIGS. 1 and 2, the flexible circuit assembly 12 includes a senselead portion 30 configured to provide cell voltage sensing relative to the first plurality of cells 20. The senselead portion 30 includes a plurality of traces 32 having varying lengths and respectively connected to a plurality of pads 34 via a respective curved portion 33. In the embodiment shown in FIG. 2, the plurality of traces 32 are substantially parallel to one another and extend in a first direction D1. The plurality of pads 34 are substantially parallel to one another and extend in a second direction D2. The second direction D2 may be orthogonal to the first direction D1.

Referring to FIG. 2, the plurality of traces 32 may be terminated at an end region 36, for example, by crimping, soldering, welding, electrically-conductive adhesive bonding and other methods. The plurality of traces 32 and plurality of pads 34 may be formed by etching metal foil (such as aluminum or copper), plating metal and printing of conductive inks. The size, shape and location of the plurality of traces 32 and plurality of pads 34 may be varied based on the particular application. The thickness of the senselead portion 30 may vary depending on materials used for the application and may be adjusted according to the amount of current required to pass through the plurality of traces 32. In one example, the thickness of the senselead portion 30 ranges between 10 micron and 300 micron. The plurality of traces 32 may be configured to be relatively thin and plurality of pads 34 may be configured to be relatively thick. Alternatively, the thickness may be uniform between the plurality of pads 34 and the plurality of traces 32.

Various materials for the plurality of traces 32 and plurality of pads 34 may be employed. For example, the senselead portion 30 may be composed of aluminum with uniform thickness or with local plating in desired areas (e.g. with copper and/or nickel), having slight thickness variation due to the local plating. The senselead portion 30 may be composed of copper with uniform thickness or with local plating in desired areas (e.g. with nickel and/or gold or tin). The material combinations may be employed with a weld or solder joint between the plurality of traces 32 and plurality of pads 34. The flexible circuit assembly 12 may be formed using software-based processes such as photoimaging, laser drilling, printing, cutting or contouring. Alternately, the processes may include stamped lead frames, inserts or injection molds. Surface treatments may be applied to the senselead portion 30 for robust joining process, including but not limited to: nickel plating, additive copper surface treatments, and combinations of copper underplate, nickel plating and tin plating.

The flexible circuit assembly 12 may include a first outer layer 38 and as second outer layer 40. The conductive parts of the senselead portion 30 (and other areas such as the thermal sheet 44) may be sandwiched between the first outer layer 38 and the second outer layer 40. Referring to FIG. 2, the first outer layer 38 may be selected such that the flexible circuit assembly 12 is capable of being sufficiently bent or folded. The second outer layer 40 is configured to insulate the senselead portion 30. The first outer layer 38 and the second outer layer 40 may be composed of a polymeric insulation film (including but not limited to polyimide, PET and PEN).

Referring to FIGS. 1 and 2, the flexible circuit assembly 12 may include at least one thermal sheet 44. Referring to FIG. 2, the thermal sheet 44 may include a heat-conducting element 46 (e.g. aluminum and/or copper) interspersed or arranged with a thermistor material 48 (e.g. PTC ink) applied for heating capability. In one example, the heat-conducting element 46 is aluminum and the thermistor material 48 is a positive temperature coefficient (PTC) ink. The heat-conducting element 46 may be laid out in a crisscross pattern such that the thermistor material 48 fills a plurality of equally-spaced rectangles. A solderable electrically conductive material (e.g. copper) may be locally applied to the heat-conducting element 46 as required for interfacing to a control board (not shown). The thermal sheet 44 may experience change in electrical resistance in response to the temperature changes of the cell body and in response to an applied electrical power (i.e. electrically induced heating). The thermal sheet 44 may be configured to supply heating and/or cooling as well as sense the temperature of the plurality of cells 20 for monitoring purposes. In other words, the thermistor material may be configured as both a heating device and a temperature sensor.

The thermistor material 48 may be composed of compounds of barium lead and strontium titanates (ceramic materials). In one example, the thermistor material 48 defines a threshold temperature, with a sharply rising electrical resistance at temperatures above the threshold temperature and fairly constant low resistance at temperatures below the threshold. The power module 10 streamlines module packaging by incorporating the thermal sheet 44 (see FIGS. 1 and 2) as part of the flexible circuit assembly 12, allowing the flexible circuit assembly 12 to supply heating or cooling to the faces of the first plurality of cells 20 as well as transfer cell voltage signals.

Optionally, as shown in FIG. 1, the power module 10 may include a second plurality of cells 50 positioned adjacent to one another to form a second cell layer ($L_2$) at least partially coextensive with the first cell layer $L_1$. Similar to the first plurality of cells 20, the second plurality of cells 50 may be pouch-type cells, including but not limited to, lithium manganese, lithium ion phosphate, lithium cobalt, lithium nickel-based cells. In FIG. 1, the second cell layer ($L_2$) is positioned such that the flexible circuit assembly 12 is sandwiched between the first cell layer $L_1$ and the second cell layer ($L_2$). Referring to FIG. 1, each of the second plurality of cells 50 has a respective cell body 52 with at least four respective edges 54 and respective cell tabs T extending from one or more of the least four respective edges 54.

In the embodiment shown in FIG. 1, the respective cell tabs T include a respective first tab 56 and a respective second tab 58. Referring to FIG. 1, the respective cell bodies 22 of the first cell layer $L_1$ are aligned with the respective cell bodies 52 of the second cell layer $L_2$ such that the cathode (e.g. first tab 56) of cell 50A is aligned with the cathode (e.g. first tab 26) of cell 20A and the anode (e.g. second tab 58) of cell 50A is aligned with the anode (e.g. second tab 28) tab of cell 20A.

Referring to FIG. 1, the flexible circuit assembly 12 may be sandwiched in between the cell tabs T or on one side of the stack-up, such that when the cell tabs T are joined (e.g. by welding), a voltage sensing circuit joint J (shown in FIG. 3) is also completed in the same step. In other words, the flexible circuit assembly 12 is configured to at least partially overlap with the first cell layer $L_1$ such that a voltage sensing circuit joint J is concurrently completed when the cell tabs T of the first cell layer $L_1$ are joined.

Referring to FIG. 1, the plurality of pads 34 is configured to be electrically conductive on the first side 16 and the second side 18 and may include exposed metal on both sides. Referring to FIG. 1, the plurality of pads 34 is configured to be captured between the cell tabs T and welded such that the plurality of pads 34 is electrically interfaced with the cell tabs T at the respective captured portions 42. The technical advantage here is that busbars are not needed within a battery interconnect board (i.e. direct cell-to-cell joining is used) and voltage sensing circuits are required to interface with the cell tabs T. However, it is understood that busbars may be utilized in conjunction with the above, based on the application at hand. It is to be understood that the voltage sensing circuit joint J (shown in FIG. 3) may include one or more pads 34 residing between either two or more aluminum cell tabs or two or more copper cell tabs or one or more pads captured between copper and aluminum cell tabs. The technical advantage with multiple pads is redundancy and durability.

A method of assembling the power module 10 includes welding the respective first tab 26 and the respective second tab 28 to the flexible circuit assembly 12 (at the respective captured portions 42 shown cross-hatched in FIGS. 1 and 2). In an embodiment with the second cell layer $L_2$, the respective first tab 26 may welded to the respective first tab 56 (of the second cell layer $L_2$) with the flexible circuit assembly 12 being jointed to the cell tabs consequentially as a function of the welding process. Welding may be done with a single axis or multi-axis weld system, prior to folding. Referring to FIG. 1, the dashed alignment lines show how the respective first tab 26 is aligned with the respective captured portions 42 of the flexible circuit assembly 12 and the respective first tab 56 (of the second cell layer $L_2$) prior to welding of these components. The welding may be done ultrasonically. Resistance welding and laser welding may be employed alternatively or in addition to ultrasonic welding. The welding operatively connects the respective captured portions 42 of the flexible circuit assembly 12 and the respective first and second tabs 26, 28, 56, 58 in one step. This allows for sensing cell voltage and balancing cell groups in conjunction with a battery management system. Additionally, no secondary operations or electrical joints, such as riveting, soldering, resistance welding or facsimile are required to connect voltage sense circuitry. When directly joining neighboring ones of the cell tabs T, for example, respective second tab 28 (or anode) being joined to a respective first tab 56

(cathode), the flexible circuit assembly 12 does not carry the high current. Thus, relatively small interfaces are required to sense voltage and the flexible circuit assembly does not need to span the width of the cell terminal.

Figure 4:
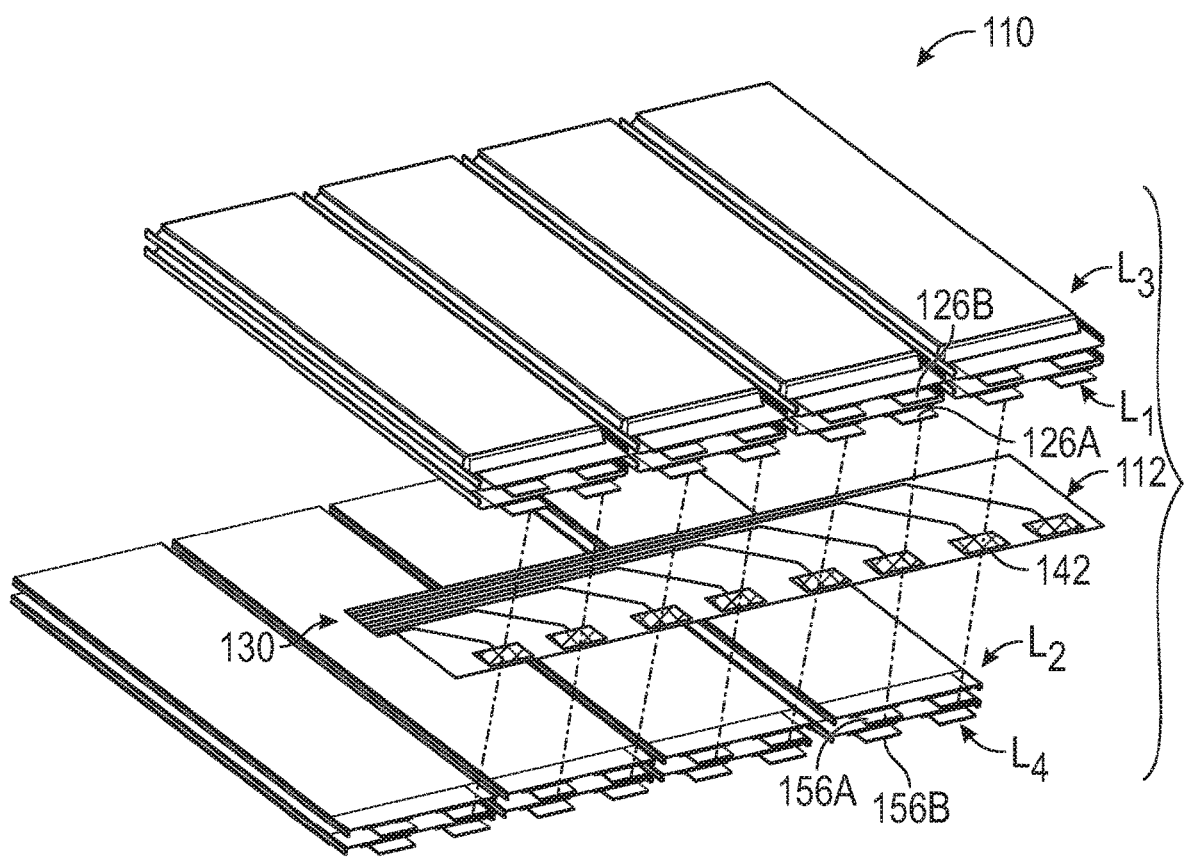
FIG. 4 is a schematic exploded view of a power module in accordance with a second embodiment.

Tab-to-tab joining may include parallel joining (cathode-to-cathode or anode-to-anode) and series joining (cathode-to-anode or vice versa). In each of these categories, there can be multiple cell tabs T and plurality of pads welded simultaneously, as noted above. For example, FIG. 1 shows parallel tab-to-tab joining while FIG. 4 depicts the series tab-to-tab joining. In the parallel tab-to-tab joining, the high current passes through the flexible circuit assembly 12 or bussing elements disposed on the flexible circuit assembly 12. In the series tab-to-tab joining (see FIG. 4), there is no high current that passes through the flexible circuit assembly 110 and the flexible circuit assembly 110 may be limited to sensing the voltage.

The power module 10 of FIG. 1 may be employed in a flat module construction or a laid-out construction, allowing for very discrete scalability, e.g. under the floor of a vehicle. The technical advantage of having modules with a low profile is enabling minimal battery pack height and scalability of pack height across various vehicles. A flat module construction may be as little as one cell thick, allowing for adaptation to different cell geometries.

Figure 3:
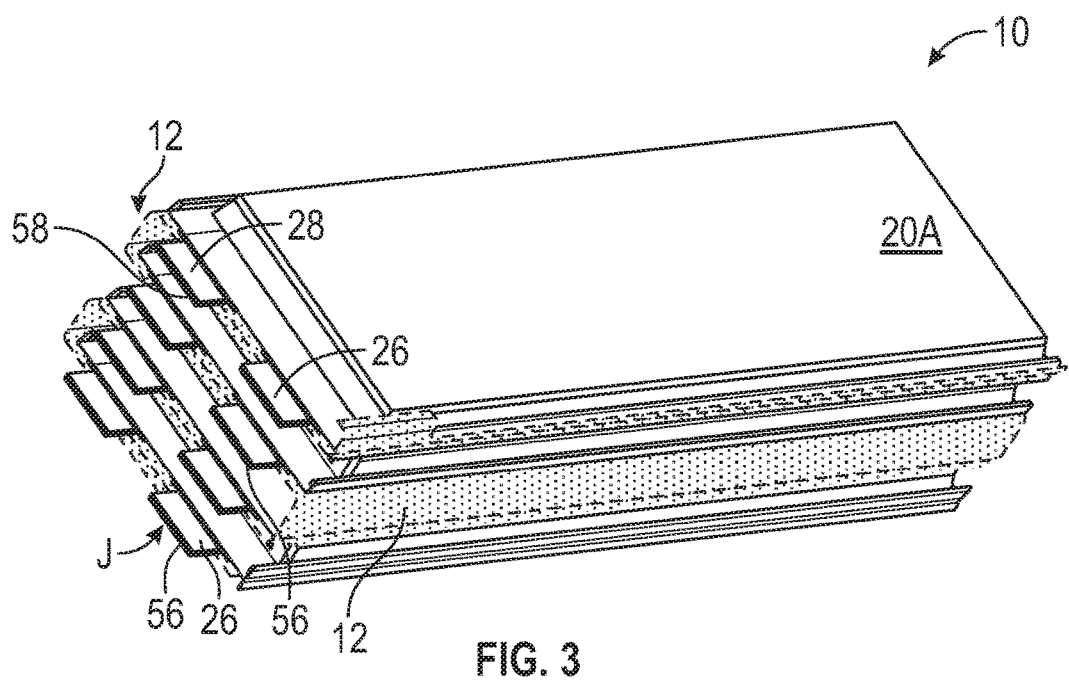
FIG. 3 is a schematic perspective view of the power module of FIG. 1, in a folded construction.

Alternatively, the power module 10 may be employed in a folded module construction. FIG. 3 shows a power module 10 after folding. The flexible circuit assembly 12 may be folded along one of the at least four respective edges 24 (see FIG. 1) of the first plurality of cells 20 to obtain a folded module. Referring to FIG. 3, neighboring or neighboring cell groups may be brought together by folding about alternating axes, such that at least one of the first plurality of cells 20 faces at least another one of the second plurality of cells 50. The folding may be a winding fold, a Z fold (forming letter Z in a profile view) or other folding sequence suitable for the application at hand. The cell tabs T may be welded prior to folding or may be welded after folding, enabling direct tab-to-tab connections with the respective captured portions 42. Additionally, the cell tabs T and the flexible circuit assembly 12 may be bent together, in an upwards or downwards direction.

Referring now to FIG. 4, a schematic exploded view of a power module 110 is shown, in accordance with a second embodiment. FIG. 4 shows two layers of cells on each side of the flexible circuit assembly 112, with a total of four layers of cells. The power module 110 includes a flexible circuit assembly 112 sandwiched between a first cell layer $L_1$ and a second cell layer $L_2$. A third cell layer $L_3$ (a third plurality of cells placed adjacent to one another) is positioned exterior to the first cell layer $L_1$. A fourth cell layer $L_4$ (formed by a fourth plurality of cells placed adjacent to one another) is positioned exterior to the second cell layer $L_2$. The dashed lines in FIG. 4 illustrate the alignment of the cell tabs T (the respective first tabs 126A, 156A, 126B, 156B of the first cell layer $L_1$, the second cell layer $L_2$, the third cell layer $L_3$ and the fourth cell layer $L_1$) with the respective captured portions 142 of the flexible circuit assembly 112, prior to being joined. FIG. 4 represents series joining (for instance, anodes or cell tabs 158A and 158B are aligned to cathodes or cell tabs 126A and 126B) in order to minimize the flexible circuit assembly 112. The two layers of cells in FIG. 1 results in two tabs being joined together simultaneously, while the four layers of cells in FIG. 4 results in four tabs being joined together simultaneously with the flexible circuit assembly 112. The power module 110 is thus scalable and may be configured with to fit as many layers of cells as desired.

Figure 5:
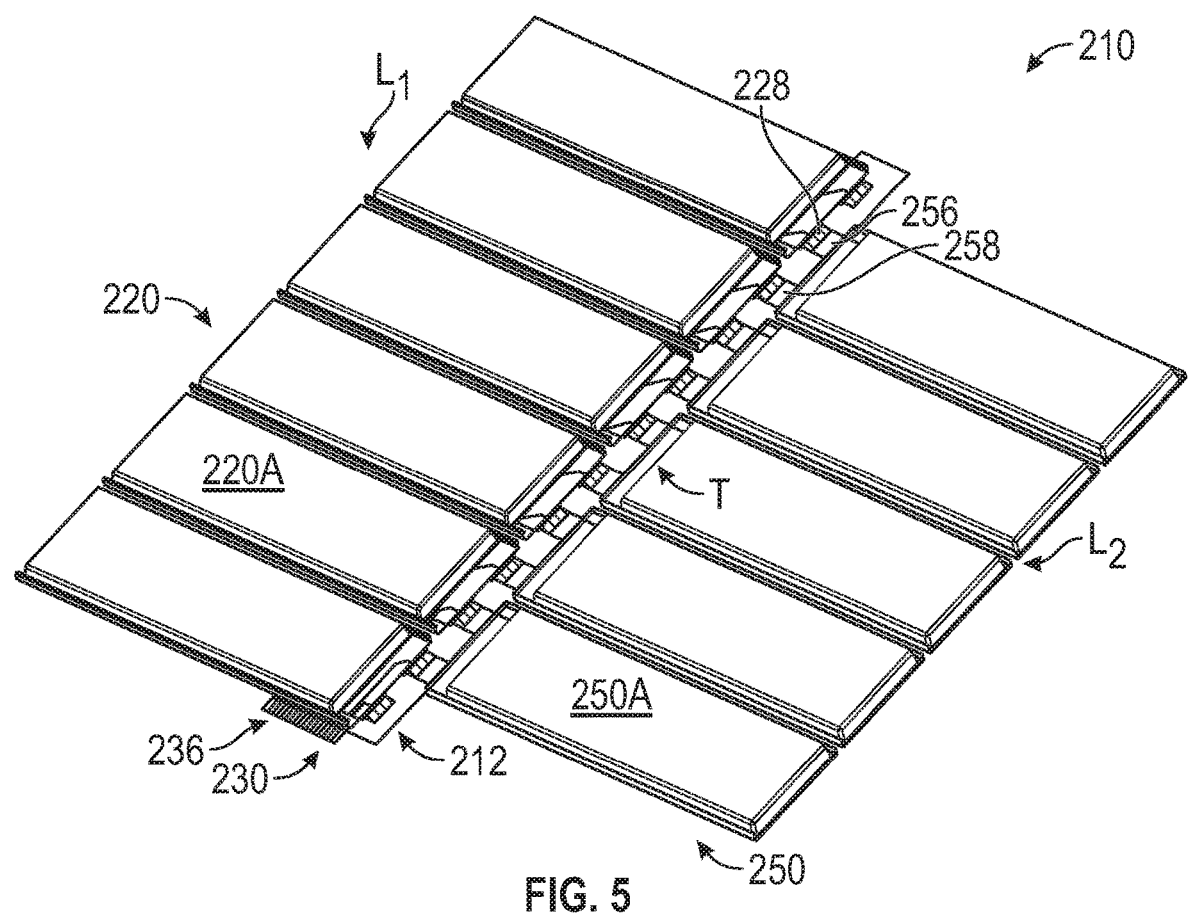
FIG. 5 is a schematic perspective view of a power module in accordance with a third embodiment.

Referring now to FIG. 5, a schematic perspective view of a power module 210 shown, in accordance with a third embodiment. The power module 210 includes adjoining layers of cells in the same plane and interfacing with a flexible circuit assembly 212. The flexible circuit assembly 212 is shown in greater detail in FIG. 6. Similar to the first embodiment, a first plurality of cells 220 (such as cell 220A) is placed adjacent to one another to form a first cell layer $L_1$. A second plurality of cells 250 (such as cell 250A) is placed adjacent to one another to form a second cell layer $L_2$. As shown in FIG. 5, the second cell layer $L_2$ is positioned on the same side of the flexible circuit assembly 212 as the first cell layer $L_1$ such that the first cell layer $L_1$ and the second cell layer $L_2$ are in the same plane.

Figure 6:
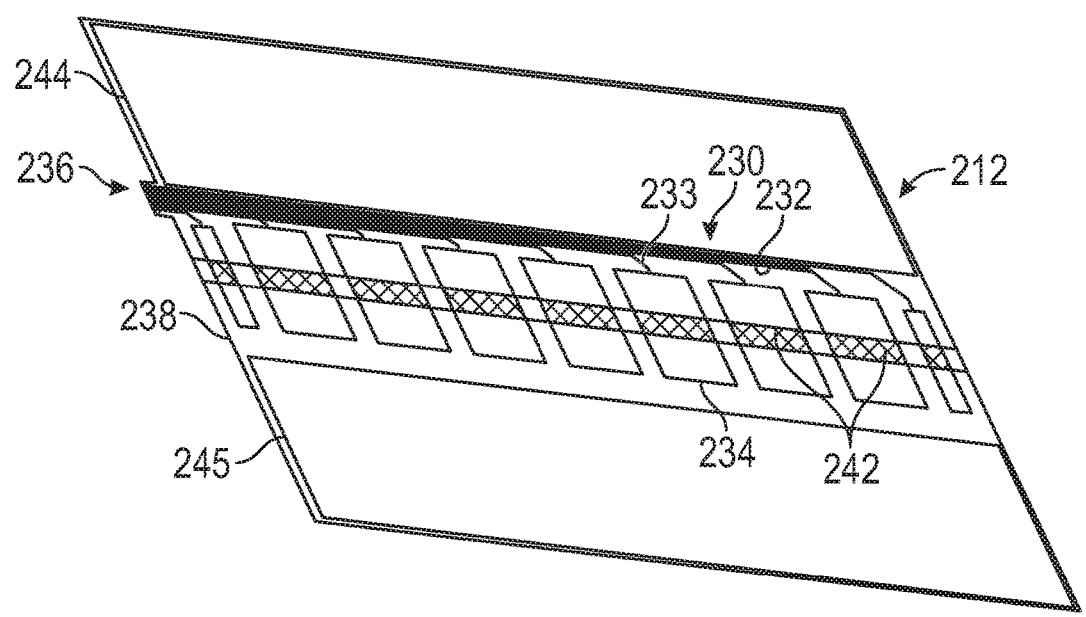
FIG. 6 is a schematic perspective view of a flexible circuit assembly that may be employed in the power module of FIG. 5.

Referring to FIG. 5, the flexible circuit assembly 212 includes a senselead portion 230 configured to provide cell voltage sensing relative to the first plurality of cells 220 and the second plurality of cells 250. Referring to FIG. 6, the senselead portion 230 includes a plurality of traces 232 having varying lengths and respectively connected to a plurality of pads 234 via a respective curved portion 233. Referring to FIG. 6, the senselead portion 230 may be bonded to a first outer layer 238, with the plurality of traces 232 being terminated at an end region 236.

Referring to FIG. 5, the first plurality of cells 220 and the second plurality of cells 250 include respective cell tabs T extending from one of their respective edges, for example, from one of the respective short opposing edges (see 24L in FIG. 1). The plurality of pads 234 is electrically conductive on at least one side and configured to interface with the cell tabs T at the respective captured portions 242.

Similar to what is done with FIG. 4, multiple additional layers may be added to this configuration, independent of how they are staggered. As shown in FIG. 5, the second cell layer $L_2$ may be configured to be staggered relative to the first cell layer $L_1$ such that the respective second tab 228 of the first cell layer $L_1$ is connected to the respective first tab 256 (as opposed to the respective second tab 258) of the second cell layer $L_2$, with staggered tab-to-tab joining between the first cell layer $L_1$ and the second cell layer $L_2$. Alternatively, the embodiment may be employed in an un-staggered fashion, with the respective second tab 228 of the first cell layer $L_1$ being connected to the respective second tab 258 of the second cell layer $L_2$.

Referring to FIG. 6, the flexible circuit assembly 212 may include a first thermal sheet 244 and a second thermal sheet 245 each respectively dimensioned to enable the plurality of pads 234 to be double-exposed (on the first side 16 and the second side 18, see FIG. 1). It is understood that the first thermal sheet 244 and the second thermal sheet 245 may be configured as shown in FIG. 2, with a respective heat-conducting element 46 (e.g. aluminum) and/or a thermistor material 48 (e.g. PTC ink). Note that portions of FIG. 6-8 have been truncated for illustration purposes.

Figure 7:
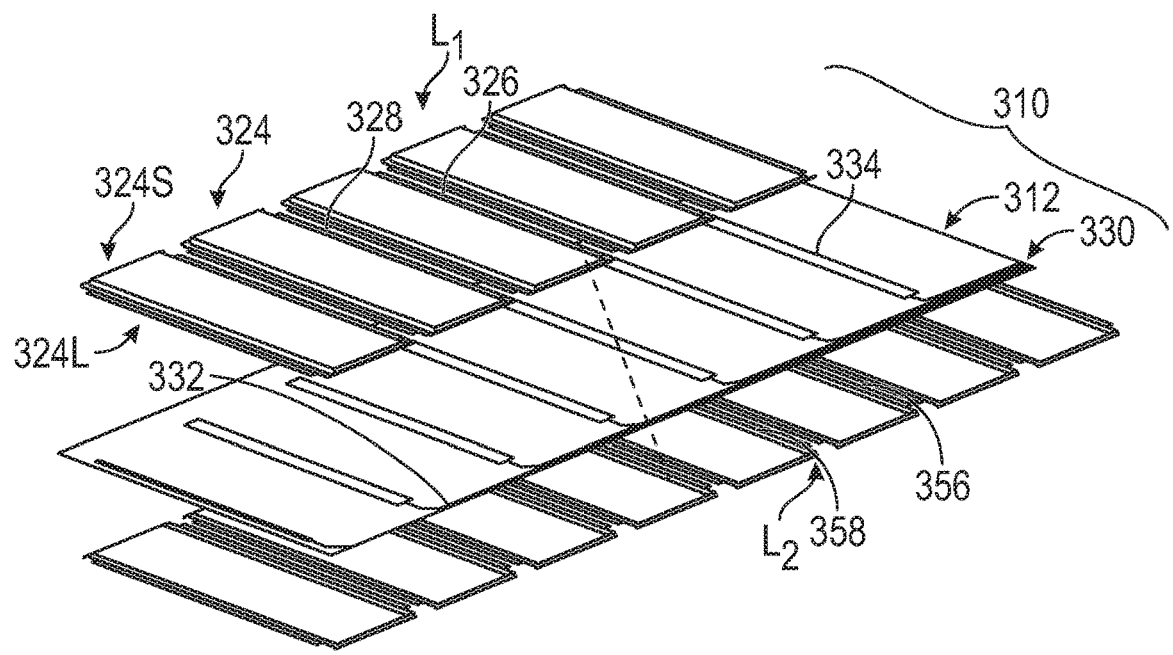
FIG. 7 is a schematic exploded fragmentary view of a power module in accordance with a fourth embodiment.

Referring to FIG. 7, a schematic exploded fragmentary view of a power module 310 is shown, in accordance with a fourth embodiment. The power module 310 includes a flexible circuit assembly 312 sandwiched by a first cell layer $L_1$ and a second cell layer $L_2$. The first cell layer $L_1$ includes respective cells (with respective edges 324) having a respective first tab 326 and a respective second tab 328. The second cell layer $L_2$ includes respective cells having a respective first tab 356 and a respective second tab 358. The respective cells of the first cell layer $L_1$ and a second cell layer $L_2$ are placed adjacent to one another along their two long opposing edges 324L (as opposed to their short opposing edges 324S), allowing for tab-to-tab connection along the two long opposing edges 324L.

Referring to FIG. 7, the flexible circuit assembly 312 includes a senselead portion 330 configured to provide cell voltage sensing relative to the first cell layer $L_1$ and the second cell layer $L_2$. The senselead portion 330 includes a plurality of traces 332 having varying lengths and respectively connected to a plurality of pads 334. The plurality of pads 334 is double-exposed (electrically conductive on the first side 16 and the second side 18 see FIG. 1) and configured to interface along a respective entire length of the respective first tab 326 and the respective second tab 328.

Figure 8:
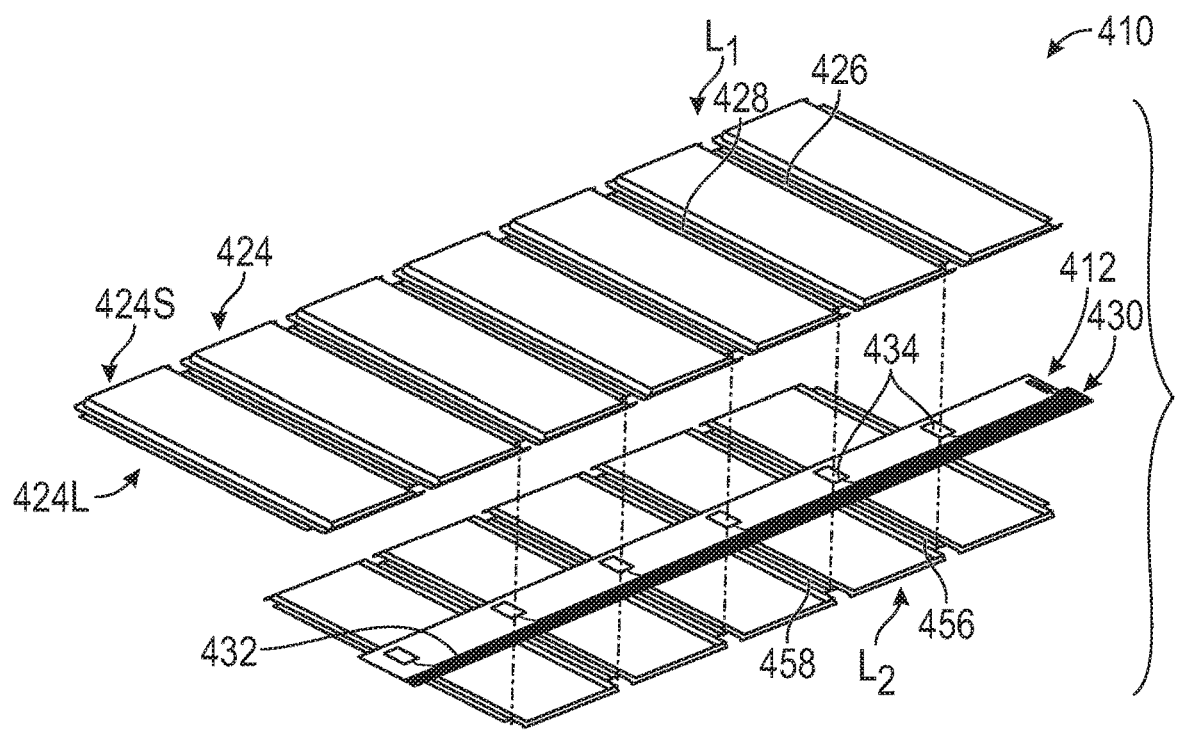
FIG. 8 is a schematic exploded fragmentary view of a power module in accordance with a fifth embodiment.

Referring to FIG. 8, a schematic exploded fragmentary view of a power module 410 is shown, in accordance with a fifth embodiment. As previously noted, portions of FIG. 6-8 have been truncated for illustration purposes. The power module 410 includes a flexible circuit assembly 412 sandwiched by a first cell layer $L_1$ and a second cell layer $L_2$. The flexible circuit assembly 412 may be configured as a strip. The first cell layer $L_1$ includes respective cells (with respective edges 424) having a respective first tab 426 and a respective second tab 428. The second cell layer $L_2$ includes respective cells having a respective first tab 456 and a respective second tab 458. The respective cells of the first cell layer $L_1$ and a second cell layer $L_2$ are placed adjacent to one another along their two long opposing edges 424L (as opposed to their short opposing edges 424S), allowing for tab-to-tab connection along the two long opposing edges 424L.

Referring to FIG. 8, the flexible circuit assembly 412 includes a senselead portion 430 having a plurality of traces 432 having of varying lengths and respectively connected to a plurality of pads 434. The power module 410 is similar to the power module 310 of FIG. 7 except that the plurality of pads 434 is configured to interface along a respective portion of the entire length of the respective first tab 426 and the respective second tab 428, but not the entire length. Since FIG. 8 has tab-to-tab joining, the senselead portion 430 carries low current levels, and the size of the plurality of pads 434 may be relatively small. In one example, the thickness of the senselead portion 430 is set to be less than 20 mm. The size of the plurality of pads 434 may be selected to be less than 5% of the length of the respective first tab 426 and the respective second tab 428.

Figure 9A:
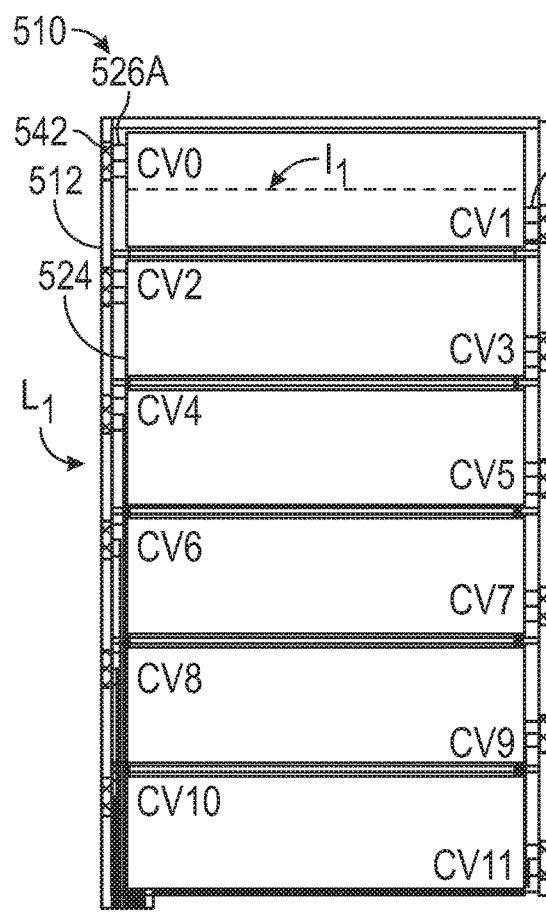
FIG. 9A is a schematic top view of a power module in accordance with a sixth embodiment.
Figure 9B:
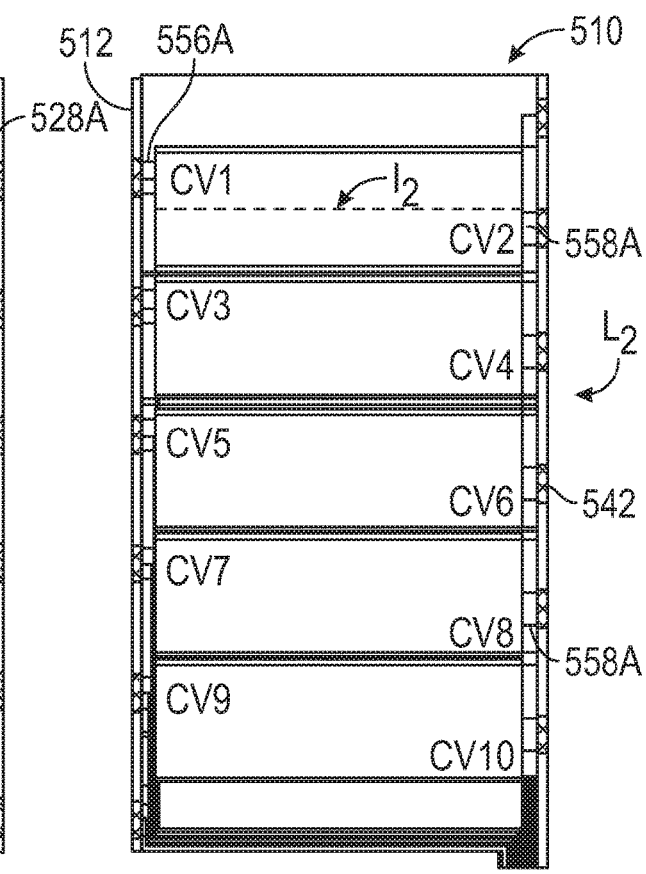
FIG. 9B is a schematic bottom view of the power module of FIG. 9A.
Figure 10:
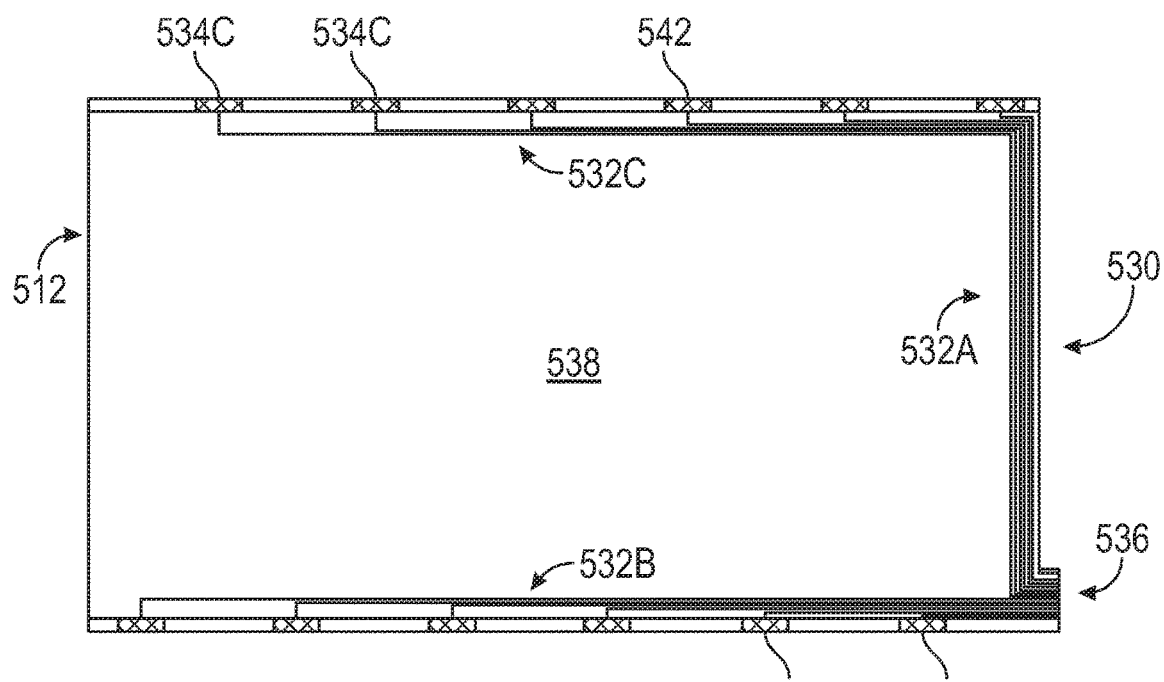
FIG. 10 is a schematic plan view of a flexible circuit assembly that may be employed in the power module of FIGS. 9A and 9B.

A power module 510, in accordance with a sixth embodiment, is shown in FIGS. 9A, 9B and 10. The power module 510 includes a flexible circuit assembly 512 sandwiched between a first cell layer $L_1$ and a second cell layer $L_2$. FIG. 9A is a schematic top view of the power module 510, while FIG. 9B is a schematic bottom view of the power module 510. FIGS. 9A, 9B illustrates a cell voltage sequence with a staggered two-layer cell arrangement and tab-to-tab joining.

Referring to FIG. 9A, the first cell layer $L_1$ includes respective cells (with respective edges 524) with a respective first tab 526A and a respective second tab 528A extending from opposing sides of the respective edges 524 (the short opposing sides in this case). Referring to FIG. 9A, the respective first tab 526A is offset from an imaginary center axis $I_1$ in a first direction, the imaginary center axis extending through a center of the respective cell body. The respective second tab 528A is offset from the imaginary center axis $I_1$ in a second direction opposite to the first direction. The advantage of utilizing an offset position is that the cell tabs T in $L_1$ and $L_2$ may be aligned in a staggered fashion for a series cell-to-cell tab joining configuration; thus the flexible circuit assembly 512 does not carry high current and can incorporate a minimal form factor. Additionally, with an offset in the cell thickness direction, the cell tabs T in $L_1$ and $L_2$ may be in such close proximity that bending of cell tabs T is not required to complete the series cell-to-cell tab joining configuration.

Similarly, referring to FIG. 9B, the respective first tab 556A of the second cell layer $L_2$ is offset from an imaginary center axis $I_2$ in a first direction, the imaginary center axis extending through a center of the respective cell body. The respective second tab 558A of the second cell layer $L_2$ is offset from the imaginary center axis $I_2$ in a second direction opposite to the first direction. There are different offsets that may be employed, for example, an offset in the Y-direction (shown in FIGS. 9A, 9B) and/or an offset in the Z-direction. The magnitude of the offset in the Y-direction and/or the Z-direction may be varied. The advantage of utilizing an offset position is that the cell tabs T in the first and second cell layers $L_1$ and $L_2$ may be aligned in staggered fashion for a series cell-to-cell tab joining configuration; thus the flexible circuit assembly 512 does not carry high current and can incorporate a minimal form factor.

Referring to FIGS. 9A and 9B, the second cell layer $L_2$ is configured to be staggered relative to the first cell layer $L_1$ such that the respective second tab 528A of the first cell layer $L_1$ aligns with the respective first tab 556A of the second cell layer $L_2$, enabling tab-to-tab joining between the first cell layer and the second cell layer. Likewise, the respective second tab 558A of the second cell layer $L_2$ aligns with the respective first tab 526A of the first cell layer $L_1$ (with senselead pad 542 sandwiched in between the cell tabs). The power module 510 is configured to generate a desired voltage given a number of cells connected in series electrically. Thus, there is a given cell voltage sequence (CV0, CV1, CV2, CV3, CV4, CV5, CV6, CV7, CV8, CV9, CV10 and CV11) shown in FIGS. 9A, 9B.

Referring to FIG. 10, the flexible circuit assembly 512 may include a sheet 538, which may be a solid or semi-solid cross-hatched sheet, for the purpose of heat transfer between the cell face and adjoining cooling systems (not shown). A senselead portion 530 is bonded to the sheet 538. The senselead portion 530 includes a first plurality of traces 532A, a second plurality of traces 532B and a third plurality of traces 532C, extending respectively along a first peripheral portion, a second peripheral portion and a third peripheral portion of the flexible circuit assembly 512. In the example shown, the first peripheral portion is orthogonal to the second peripheral portion and the third peripheral portion (the second peripheral portion and the third peripheral portion being parallel). It is understood that the shape of the routing may be varied based on the application at hand. The first plurality of traces 532A may be terminated at an end region 536. Referring to FIG. 10, a first plurality of pads 534B is configured to extend along the second peripheral portion of the flexible circuit assembly 512. A second plurality of pads 534C is configured to extend the third peripheral portion, the second peripheral portion and the third peripheral portion being parallel and on opposing sides.

In summary, various configurations for a power module 10, 110, 210, 310, 410, 510 are disclosed. The configurations include a planar cell layout or flat module form factor in which symmetric or asymmetric cells are lined edge-to-edge, tab-to-tab, or in a staggered manner and in which current paths or bussing is primarily planar (i.e. 2D). Additionally, the flexible circuit assembly 12, 112, 212, 312, 412, 512 may be interchanged to interconnect cells of various form factors. Interconnect boards in battery modules/packs may have several electrical interfaces and joining processes. For example, high current joints, such as stamped busbars, are generally made in a separate process than low current joints. The various configurations described are configured to require fewer joining steps and a number of other technical advantages. It is understood that various types of staggering may be employed to each of the embodiments shown. For example, in-plane staggering on a single side of the flexible circuit assembly (shown in FIG. 5 of the drawings), and out-of-plane staggering on both sides of the flexible circuit assembly (as shown in FIGS. 9A, 9B). Each of the embodiments shown may also be employed in an unstaggered fashion. Additional layers of cells (as shown in FIG. 4) may also be incorporated in each of the embodiments shown.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or more desired characteristics from other embodiments, resulting in other embodiments not described in words or by reference to the drawings. Accordingly, such other embodiments fall within the framework of the scope of the appended claims.

What is claimed is:

1. A power module comprising:
a flexible circuit assembly having at least one electrically conductive portion, the flexible circuit assembly defining a first side and a second side;
a first plurality of cells placed adjacent to one another to form a first cell layer, the first cell layer being positioned on the first side of the flexible circuit assembly;
wherein each cell of the first plurality of cells has a respective cell body with at least four respective edges;
wherein each cell of the first plurality of cells has respective cell tabs, including a respective first tab and a respective second tab both extending from one of the at least four respective edges of the respective cell body;
wherein the flexible circuit assembly includes at least one thermal sheet configured to experience a change in electrical resistance in response to a temperature change, the at least one thermal sheet including a heat-conducting element arranged with a thermistor material;
wherein the flexible circuit assembly includes a senselead portion having a plurality of traces respectively connected to a plurality of pads; and
wherein the flexible circuit assembly is configured to be aligned with the first cell layer such that a voltage sensing circuit joint is concurrently completed when the respective cell tabs of each cell of the first cell layer are joined to respective captured portions of the flexible circuit assembly.

2. The power module of claim 1, wherein:
the at least four respective edges in each cell of the first plurality of cells include two long opposing edges and two short opposing edges; and
the respective first tab and the respective second tab in each cell of the first plurality of cells extend from one of the two long opposing edges of the respective cell body.

3. The power module of claim 1, wherein:
the at least four respective edges in each cell of the first plurality of cells include two long opposing edges and two short opposing edges; and
the respective first tab and the respective second tab in each cell of the first plurality of cells extend from one of the two short opposing edges of the respective cell body.

4. The power module of claim 1, wherein:
the plurality of traces is substantially parallel to one another and extends in a first direction; and
the plurality of pads is substantially parallel to one another and extends in a second direction orthogonal to the first direction.

5. The power module of claim 4, wherein:
the plurality of pads is configured to extend along a first peripheral portion and a second peripheral portion of the flexible circuit assembly, the first peripheral portion and the second peripheral portion being parallel and on opposing sides.

6. The power module of claim 1, further comprising:
a second plurality of cells placed adjacent to one another to form a second cell layer, the second cell layer being positioned on the second side of the flexible circuit assembly;
wherein each cell of the second plurality of cells has respective cell tabs; and
wherein the respective cell tabs of neighboring pairs of the first cell layer and the second cell layer are configured to be joined to respective captured portions of the flexible circuit assembly.

7. The power module of claim 6, wherein:
the flexible circuit assembly is configured to be folded along at least one axis of rotation such that one of the first plurality of cells faces another one of the second plurality of cells.

8. The power module of claim 6, further comprising:
a third cell layer positioned exterior to the first cell layer and including a third plurality of cells adjacent to one another; and
a fourth cell layer positioned exterior to the second cell layer and including a fourth plurality of cells adjacent to one another.

9. The power module of claim 1, further comprising:
a second plurality of cells placed adjacent to one another to form a second cell layer; and
wherein the second cell layer is positioned on the first side of the flexible circuit assembly adjoining the first cell layer such that the first cell layer and the second cell layer are in a same plane.

10. The power module of claim 9, wherein:
the first thermal sheet and a second thermal sheet are each respectively dimensioned such that at least a portion of the plurality of pads is exposed on the first side and the second side of the flexible circuit assembly.

11. A power module comprising:
a flexible circuit assembly having at least one electrically conductive portion, the flexible circuit assembly defining a first side and a second side;
a first plurality of cells placed adjacent to one another to form a first cell layer, the first cell layer being positioned on the first side of the flexible circuit assembly;

wherein each cell of the first plurality of cells has a respective cell body with at least four respective edges;

wherein each cell of the first plurality of cells has respective cell tabs, including a respective first tab and a respective second tab extending from opposing edges of the at least four respective edges of the respective cell body;

wherein the flexible circuit assembly includes at least one thermal sheet and a senselead portion having a plurality of traces respectively connected to a plurality of pads, the at least one thermal sheet being configured to experience a change in electrical resistance in response to a temperature change;

wherein the plurality of pads is electrically conductive on the first side and the second side, the plurality of pads being configured to interface with each cell of the first plurality of cells; and wherein the flexible circuit assembly is configured to be aligned with the first cell layer such that a voltage sensing circuit joint is concurrently completed when the respective cell tabs of each cell of the first cell layer are joined to respective captured portions of the flexible circuit assembly.

12. The power module of claim 11, wherein:

the at least four respective edges in each cell of the first plurality of cells include two long opposing edges and two short opposing edges; and the respective first tab and the respective second tab of each cell of the first plurality of cells extend from the two short opposing edges of the respective cell body.

13. The power module of claim 11, wherein:

the at least four respective edges in each cell of the first plurality of cells include two long opposing edges and two short opposing edges, the respective first tab and the respective second tab respectively extending from the two long opposing edges of the respective cell body; and the respective first tab and the respective second tab of neighboring pairs of each cell of the first plurality of cells are configured to be joined.

14. The power module of claim 13, wherein:

the respective first tab of a first of the neighboring pairs is offset from an imaginary center axis in a first direction, the imaginary center axis extending through a center of the respective cell body; and wherein the respective second tab of a second of the neighboring pairs is offset from the imaginary center axis in a second direction opposite to the first direction.

15. The power module of claim 11, wherein:

the plurality of pads is configured to interface along an entire length of the respective cell tabs of each cell of the first plurality of cells.

16. The power module of claim 11, wherein:

the plurality of pads is configured to interface along a respective portion of the respective cell tabs of each cell of the first plurality of cells, and not the entire length.

17. The power module of claim 13, further comprising:

a second plurality of cells placed adjacent to one another to form a second cell layer, the second cell layer being positioned on the second side of the flexible circuit assembly;

wherein each cell of the second plurality of cells has a respective cell body with at least four edges;

wherein each cell of the second plurality of cells includes a respective first tab and a respective second tab extending from opposing sides of the at least four edges of the respective cell body; and wherein the second cell layer is configured to be staggered relative to the first cell layer such that the respective second tab of each cell of the first cell layer aligns with the respective first tab of each cell of the second cell layer, enabling tab-to-tab joining between the first cell layer and the second cell layer.

18. A method of assembling a power module, the method comprising:

configuring a flexible circuit assembly with one or more electrically conductive portions, the flexible circuit assembly defining a first side and a second side;

placing a first plurality of cells adjacent to one another to form a first cell layer, the first cell layer being positioned on the first side of the flexible circuit assembly;

forming each cell of the first plurality of cells with a respective cell body with at least four respective edges;

forming each cell of the first plurality of cells with respective cell tabs, including a respective first tab and a respective second tab both extending from one of the at least four respective edges of the respective cell body;

positioning at least one thermal sheet within the flexible circuit assembly, the at least one thermal sheet configured to experience a change in electrical resistance in response to a temperature change and including a heat-conducting element arranged with a thermistor material; and aligning the flexible circuit assembly with the first cell layer such that a voltage sensing circuit joint is concurrently completed when the respective cell tabs of each cell of the first cell layer are joined to respective captured portions of the flexible circuit assembly.

19. The method of claim 18, further comprising:

positioning a senselead portion within the flexible circuit assembly, the senselead portion having a plurality of traces respectively connected to a plurality of pads;

configuring the plurality of traces to be substantially parallel to one another and extending in a first direction; and configuring the plurality of pads to be substantially parallel to one another and extending in a second direction orthogonal to the first direction.

* * * * *